United States Patent
Booth et al.

(10) Patent No.: US 9,627,949 B2
(45) Date of Patent: Apr. 18, 2017

(54) METHOD OF VERTICALLY ASSEMBLING A GENERATOR OF A WIND TURBINE

(71) Applicants: James Kenneth Booth, Brande (DK); Rune Nielsen, Ikast (DK)

(72) Inventors: James Kenneth Booth, Brande (DK); Rune Nielsen, Ikast (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 252 days.

(21) Appl. No.: 13/893,654

(22) Filed: May 14, 2013

(65) Prior Publication Data

US 2013/0305521 A1    Nov. 21, 2013

(30) Foreign Application Priority Data

May 21, 2012  (EP) .................................. 12168727

(51) Int. Cl.
| | |
|---|---|
| *H02K 15/02* | (2006.01) |
| *H02K 15/10* | (2006.01) |
| *H02K 15/16* | (2006.01) |
| H02K 7/18 | (2006.01) |

(52) U.S. Cl.
CPC ............. *H02K 15/02* (2013.01); *H02K 15/16* (2013.01); *H02K 7/1838* (2013.01); *Y02E 10/725* (2013.01); *Y10T 29/49012* (2015.01); *Y10T 29/53143* (2015.01)

(58) Field of Classification Search
CPC .......................... H02K 15/03; Y10T 29/49012
USPC ....... 29/598, 592.1, 592, 596, 606; 335/284; 290/44, 55
See application file for complete search history.

(56) References Cited

U.S. PATENT DOCUMENTS

| | | | | |
|---|---|---|---|---|
| 1,822,096 | A | * | 9/1931 | Hollander ..................... 310/427 |
| 3,387,152 | A | * | 6/1968 | Mucke ............................. 310/89 |
| 3,988,622 | A | * | 10/1976 | Starcevic ........................ 310/91 |
| 4,973,868 | A | * | 11/1990 | Wust ........................ H02K 1/27 310/156.02 |
| 6,477,761 | B1 | * | 11/2002 | Ohashi et al. .................. 29/596 |
| 7,772,741 | B1 | * | 8/2010 | Rittenhouse .................. 310/257 |

(Continued)

FOREIGN PATENT DOCUMENTS

| | | |
|---|---|---|
| CN | 201122882 Y | 9/2008 |
| CN | 201887607 U | 6/2011 |

(Continued)

*Primary Examiner* — Paul D Kim

(57) ABSTRACT

A method of vertically assembling a generator of a wind turbine is provided. The method includes A rotor part is arranged on a horizontal assembly which supports components of the generator such that a rotational axis of a component is essentially vertical during assembly, and the assembly support is configured to allow access to an interior of a generator component during the assembly procedure; a stator part is arranged in the rotor part; and the stator part is joined to the rotor part. An assembly arrangement for a vertical assembly of a generator of a wind turbine is provided. The assembly arrangement includes a horizontal assembly support for supporting components of the generator such that a rotational axis of a component is essentially vertical during assembly, and the assembly support is configured to allow access to an interior of a generator component during the assembly procedure.

8 Claims, 6 Drawing Sheets

(56) References Cited

U.S. PATENT DOCUMENTS

| | | | | |
|---|---|---|---|---|
| 8,487,470 | B2* | 7/2013 | Grassman | 290/55 |
| 8,552,614 | B2* | 10/2013 | Altea et al. | 310/216.118 |
| 8,651,819 | B2* | 2/2014 | Giuffre | 416/209 |
| 2011/0109191 | A1* | 5/2011 | Altea et al. | 310/216.118 |
| 2014/0133985 | A1* | 5/2014 | Mongeau | F03D 9/002 |
| | | | | 416/95 |

FOREIGN PATENT DOCUMENTS

| | | |
|---|---|---|
| CN | 102299587 A | 12/2011 |
| CN | 102412669 A | 4/2012 |
| EP | 2299560 A1 | 3/2011 |
| EP | 2418761 A2 | 2/2012 |

\* cited by examiner

METHOD OF VERTICALLY ASSEMBLING A GENERATOR OF A WIND TURBINE

CROSS REFERENCE TO RELATED APPLICATIONS

This application claims priority of European Patent Office application No. 12168727.1 EP filed May 21, 2012. All of the applications are incorporated by reference herein in their entirety.

FIELD OF INVENTION

The invention describes a method of assembling a generator of a wind turbine, and an assembly arrangement for use in the vertical assembly of a generator of a wind turbine.

BACKGROUND OF INVENTION

Wind turbine generators can be very large and accordingly very heavy. For example a direct-drive generator for a horizontal axis 3.0 megawatt rated wind turbine can weigh in the order of 50-80 tons or more. The assembly of such a generator can involve first assembling a rotor structure with magnets, and assembling a stator structure with windings. These must then be merged or "married", and a bearing is mounted so that, for example in the case of an outer rotor machine, the rotor can move freely about the stator. Such a merging is usually carried out by supporting the rotor housing such that its axis of rotation is horizontal, and then inserting the horizontally-held stator into the rotor interior cavity. Since the rotational axis is horizontal throughout the merging, this procedure is generally referred to as "horizontal marriage". Various critical steps must be carried out during the marriage to ensure that the rotor, stator and bearing are all exactly positioned relative to each other and that the overall assembly is secure. A magnet loading step must also be carried out, for example to load permanent magnets onto the field arrangement of the generator, usually the rotor. When permanent magnets are used, extreme forces act on various components of the generator, and on other already loaded magnets, owing to the powerful magnetic fields. The magnetic forces and also the weight of the rotor housing can act to distort the rotor housing during the magnet loading procedure. However, it is of paramount importance that a gap of usually only a few millimeters is maintained between the field windings and the magnets during assembly. Known assembly techniques involve the use of spacers, hydraulic or other position and orientation adjustment actuators and sensors to avoid any departure from a predetermined minimum/maximum distance between rotor and stator during marriage. Such techniques might also involve the use of mechanical guidance means such as rails to guide the passage of the rotor and/or stator.

A further challenge associated with large structures such as a cylindrical hollow rotor of several meters in diameter is the inherent lack of stiffness and resulting deformation. The weight of the rotor itself can cause considerable deformation. To avoid such deformation during the marriage procedure, a support structure such as a support ring can be temporarily mounted about the rotor structure to maintain its circular perimeter. Such support rings require maintenance, servicing, and storage, and therefore add to the overall cost of construction. Furthermore, such parts can fail and result in an accidental contact between rotor and stator during marriage. A deformation of the rotor can result in a misalignment between connecting parts such as rotor, bearing and stator due to an erroneous offset at their interfaces. A further problem lies in mounting bolts through matching holes in stator, rotor and bearing in order to interconnect these, since the matching holes, which of necessity may have very little clearance, must be aligned with a very high degree of precision in order for a bolt to pass through. A further problem in such a vertical marriage is the centring of such heavy components. A further challenge in vertical marriage is that, in the merging of stator and rotor, large and very rigid handling and support structures are required for each of the rotor and stator. These support structures, although cumbersome and heavy, must be very precisely adjustable in the millimeter range, and these present a further significant cost factor. For these reasons, the known methods of assembling large generators are very time-consuming and cost-intensive.

SUMMARY OF INVENTION

It is therefore an object of the invention to provide an improved way of assembling a wind turbine generator that avoids the problems indicated above.

This object is achieved by a method of assembling a generator of a wind turbine; and by a assembly arrangement.

According to the invention, the method of assembling a generator of a wind turbine comprises the steps of providing a horizontal assembly support for supporting components of the generator such that a rotational axis of a component is essentially vertical during assembly; arranging a rotor part on the horizontal assembly support; arranging a stator part in the rotor part; and joining the stator part to the rotor part.

An advantage of the method according to the invention is that the assembly or joining of the rotor part to the stator part is greatly simplified. Since the own weight of the vertically supported rotor housing is not a problem in the generator assembly process according to the invention, a thinner rotor housing can be implemented, so that the overall weight of the rotor assembly can be kept favourably low. Furthermore, the additional steps that must be taken to stabilize the rotor housing in a prior art horizontal marriage approach, for example the use of a support ring about the rotor, are no longer required during the merging or "marriage" of rotor and stator. This can lead to considerable savings in the overall construction of a wind turbine and a wind park comprising many such wind turbines. Another advantage is that the cumbersome lifting and manoeuvring devices, required for merging the rotor and stator in a prior art "horizontal marriage" procedure, as described above, can be replaced by a comparatively simple and economical crane to transport a generator component with its axis in a vertical orientation. Such a crane presents a considerably cheaper option, and can be at least as reliable and precise.

According to the invention, the assembly arrangement for use in the assembly of a generator of a wind turbine comprises a horizontal assembly support for supporting components of the generator such that a rotational axis of a component is essentially vertical during assembly, and wherein the assembly support is realised to allow access to an interior of a generator component during the assembly procedure.

An advantage of the assembly arrangement according to the invention is that, with relatively low costs, a very accurate assembly process can be achieved. With the assembly arrangement according to the invention, gravity is no longer a detrimental force that needs to be worked against, instead it is now an ally. A heavy part such as a rotor housing will no longer be distorted by its own weight; instead its weight is now an advantage, since it acts to keep the heavy part in place on the assembly support. Furthermore, because the assembly support allows access to an interior of a part during the assembly procedure, many assembly steps can be carried out as the generator components are conveniently arranged on the assembly support. Another advantage of the assembly arrangement according to the invention is that it requires less floor space than a comparable horizontal assembly apparatus, which is of necessity large and bulky in order to be able to carry the rotor part and stator part horizontally. The importance of this aspect becomes even more relevant for the assembly of many generators, since significantly less floor-space is required for a plurality of assembly stations, each comprising an assembly arrangement according to the invention, than conventional "horizontal marriage" assembly stations.

The invention also describes the use of an assembly arrangement according to the invention in the assembly of a wind turbine generator.

Particularly advantageous embodiments and features of the invention are given by the dependent claims, as revealed in the following description. Features of different claim categories may be combined as appropriate to give further embodiments not described herein.

In the following, it may be assumed that the generator is a direct-drive generator with an outer rotor, i.e. the stator is arranged in the interior of the rotor. In such a direct-drive generator, permanent magnets are generally arranged in the interior of the rotor, so that the rotor acts as the field of the generator. Similarly, windings are generally arranged about the outer surface of the stationary stator, which therefore acts as the armature of the generator. In the following, without restricting the invention in any way, it may be assumed that the generator is a direct-drive generator with permanent magnets arranged on the interior of the rotor. Furthermore, in the following, the terms "rotor part" and "stator part" are to be understood to mean partially or completely assembled rotor and stator respectively. For example, the rotor part can comprise the rotor housing already mounted to another component such as a main bearing; the stator part can comprise a main shaft about which the windings have already been mounted, etc.

To ensure that the rotor travels smoothly about the stator, in a preferred embodiment of the invention, the assembly of the generator comprises the step of mounting the rotor part to a bearing. This step can be carried out before the rotor part is lowered to the horizontal assembly support. The bearing can comprise any suitable bearing arrangement such as a roller bearing with a plurality of rollers arranged in a race; a sliding bearing, etc.

During operation of the wind turbine, i.e. when the axis of rotation of the generator is more or less horizontal, the force of gravity acting on the circular generator components could cause these to become distorted. Therefore, in a further preferred embodiment of the invention, the assembly method also comprises step of mounting an anti-ovalization ring to the bearing and/or to the rotor part. Such an anti-ovalization ring serves to counteract the tendency of a circular component such as the bearing to become distorted by the vertical pull of gravity and prevents it from departing from its circular round shape. The anti-ovalization ring thus favourably reduces wear in the bearing and extends its lifetime.

In contrast to other types of generator, a direct-drive generator generally does not use slip rings for commutation. As a result, shaft voltages can build up and a current path might discharge to ground through the bearings. This can ultimately lead to fretting of the bearings and costly repairs. Therefore, in a further preferred embodiment of the invention, the assembly method also comprises the step of mounting a grounding arrangement to the rotor part. For example, an isolation ring made of suitable material such as a glass epoxy laminate is generally mounted to the bearing and/or rotor housing to electrically isolate the bearing from the rotor and/or stator.

The stator part, which may already be pre-mounted with a plurality of stator windings, can be simply introduced into the waiting rotor part to merge the stator and rotor. For a direct-drive generator, the bearing is generally arranged toward the hub side of the rotor housing, while a brake disc is generally arranged at the opposite side of the rotor housing. Therefore, in a preferred embodiment of the method according to the invention, the stator part is inserted through a "brake side" opening of the rotor part, in the direction of the "hub side". For example, if the rotor part is arranged on the horizontal assembly support such that the bearing is resting directly on the horizontal assembly support, the stator part can be simply lowered through the opening at the "brake side" of the rotor part. This can be done by suspending the stator part by crane, manoeuvring it over the opening, and lowering it into the rotor part until it rests on the bearing. Subsequently, the stator can be connected to the bearing. Since the stator shaft is hollow (to later provide a passage from the nacelle through the generator into the hub), and since the rotor part is arranged on the horizontal assembly support, workers can conveniently access any fastening means for connecting the stator part to the bearing.

While inserting the stator part into the rotor part, it is important to ensure that the windings are not damaged; neither should any inner surface of the rotor housing become damaged. Therefore, in a further preferred embodiment of the invention, the step of arranging the stator part in the rotor part comprises the step of providing a number of spacers to ensure maintenance of a desired distance between the rotor part and the stator part. Such spacers can comprise protective elements that are temporarily arranged in the rotor housing, and that are removed again once the stator part is satisfactorily positioned within the rotor part.

As mentioned in the introduction, the process of loading magnets into the generator is usually associated with large unbalanced forces until all the magnets have been loaded, at which stage the forces effectively balance each other out. To prevent any unwanted distortion of the rotor housing during the loading process, the assembly method according to the invention preferably also comprises the step of mounting a stabilizing ring to the rotor part prior to loading a plurality of magnets into the rotor part. This stabilizing ring can be mounted temporarily about the rotor part, so that it is only used during the magnet loading step. Afterwards, it may be removed again and used in the assembly of another generator.

The magnets could be mounted in the rotor part before the stator part is inserted. However, the magnetic forces generated by the permanent magnets might increase the hazards of other assembly steps that need to be carried out in the vicinity of the rotor part or in the interior of the rotor part before the stator part is inserted. Furthermore, if the magnets are already loaded, the step of inserting the stator part can be made more challenging, since the very narrow airgap between magnets and windings makes it difficult to ensure that the windings are not damaged during the insertion step. Therefore, in a particularly preferred embodiment of the method according to the invention, the magnets are mounted to the rotor part after the step of arranging the stator part in the rotor part. The magnet loading procedure can be performed by lowering magnets in a vertical manner into the rotor part and securing them to an inside surface of the rotor housing. Preferably, the rotor housing is manufactured to comprise holding grooves into which the magnets can be slotted, to prevent any lateral motion in the direction of the stator windings. The magnet loading procedure is preferably carried out in a controlled sequence to ensure an even or balanced loading of the differently poled magnets ("north" poled magnets and "south" poled magnets).

The horizontal assembly support can be realised in any appropriate manner. In one realisation, the horizontal assembly support comprises a horizontal area at floor level, with an opening or pit realised to coincide with an opening of the rotor part or stator part, and large enough to accommodate one or more workers. However, such a realisation might require considerable construction effort, and pits below floor level may present a safety hazard. Therefore, in a particularly preferred embodiment of the invention, the assembly arrangement comprises a raised horizontal assembly support. Here, the term "raised" is to be understood to mean raised at some suitable height above floor level, in the manner of a table. For example, the horizontal assembly support can comprise several supporting sections, each with a horizontal supporting surface, and these supporting sections can be arranged relative to each other such that each horizontal supporting surface can be arranged under a portion of a rotor. In one embodiment, three or four such supporting sections could be arranged at 120° or 90° to each other so that the weight of the rotor is evenly carried. The supporting sections can be shaped so that, when placed in such an arrangement, a worker can access the interior of the rotor or stator that rests on the assembly support. However, before resting the rotor on such a compound assembly support, the upper surfaces must first be exactly aligned, and such an alignment process might be time-consuming and prone to inaccuracies. Therefore, in a particularly preferred embodiment of the invention, the assembly support comprises an assembly table with an essentially horizontal single upper surface. The upper surface of the assembly table is therefore an essentially one-piece surface. In a further preferred embodiment of the invention, the assembly table comprises an access opening shaped according to an opening of the rotor part. For example, the assembly table can have a circular opening large enough to afford comfortable access to the relevant regions of the stator/rotor parts.

The assembly table can be realised in the manner of a conventional table, i.e. with three, four, or more supporting legs. The entire assembly table can be made of a suitable load-bearing material, for example steel. As indicated above, the upper surface of the assembly table is preferably horizontal, since the alignment of the rotor and stator must be very exact, so that a horizontal reference surface is beneficial. Therefore, in a particularly preferred embodiment of the invention, the assembly table comprises a level adjusting means for adjusting the level of the upper surface. For example, one or more of the table legs can comprise a height-adjustable section. These height-adjustable sections can be extended or compressed independently of each other until a satisfactorily horizontal upper surface is obtained. The level adjustment can be carried out prior to lowering the rotor part onto the assembly table, and/or after lowering the rotor part onto the assembly table.

During assembly of the generator, it may be necessary to access regions on the "lower face" of the rotor, i.e. the face that rests on the assembly table. Therefore, in a preferred embodiment of the invention, the assembly support comprises a plurality of spacer blocks, preferably at least three spacer blocks, mounted to the assembly support to provide access to the underside of the rotor part. The spacer blocks are preferably securely arranged on the assembly table, so that the rotor part in turn can be securely arranged on the spacer blocks. Such spacer blocks can fulfil a number of other important purposes. For example, a lower set of spacer blocks can support an anti-ovalization ring, while initially providing space between the anti-ovalization ring and the rotor housing. Therefore, in a preferred embodiment of the invention, the plurality of spacer blocks comprises a set of main spacer blocks for supporting the rotor part, and a set of auxiliary spacer blocks for supporting a further part, such as an anti-ovalization ring. Furthermore, the spacer blocks can be realised to permit a rotation of an inner ring of the bearing relative to the rotor part so that the bearing can be "run in". Such a bearing inner ring will be stationary during normal operation of the generator. In a first step of such a bearing "run in" process, the stator part is loosely bolted to the bearing. The bearing and stator part are then rotated together a number of times relative to the rotor part. Subsequently, any connecting bolts can be tightened to half-torque. In a next step, the stator part and bearing are again rotated together a number of times. Finally, the bolts are tightened to full torque. This bearing run-in process ensures that the bearing is not subject to uneven strain and stress, and favourably extends its lifetime. Such a run-in process is much more difficult to perform, if not impossible, during a conventional horizontal merging procedure.

The size of the access opening and/or the height of a spacer block are preferably chosen to suit the dimensions of the generator being assembled. For example, the generator of a 3.0 megawatt wind turbine can have a diameter in the region of two or more meters. The diameter of the rotor interior can therefore be close to 2 m, while the interior diameter of the stator can be in the region of 1.5 m. Therefore, in a particularly preferred embodiment of the invention, a diameter of the access opening in the assembly table comprises at least 0.5 m. The height of a spacer block may also be chosen in consideration of the types of tool used when working on the lower rotor face. For example, the height of a spacer block may comprise at least 10 cm, more preferably at least 50 cm, in any case the height is preferably chosen to allow comfortable tool access without compromising the stability of the supporting structure.

In a further preferred embodiment of the method according to the invention, a step of fastening the rotor part to the horizontal assembly support is carried out prior to the step of arranging the stator part in the rotor part. In this way, the rotor is already securely mounted to the assembly support, and its position is therefore already defined. The position of the stator relative to the rotor can therefore be exactly determined, so that the stator can be lowered into the rotor with the correct alignment. The rotor can be secured to the horizontal assembly support using any appropriate fastening means, for example vertical bolts or threaded rods that extend through the assembly support and into corresponding threaded bushings of the rotor. Such threaded rods can pass through corresponding openings in the assembly table and into bushings of the rotor. However, in a preferred embodiment of the invention, when spacer blocks are used, a spacer block preferably comprises one or more through-openings to accommodate such a threaded rod for fastening the rotor part to the assembly table. In this way, an additional degree of stability can be obtained. Such threaded rods can also act as visual and physical guides when lowering the rotor part and/or bearing onto the assembly table and centring these components. Furthermore, the threaded rods ensure that the rotor part and/or bearing are in a predefined position or orientation, thus facilitating the later attachment of a stator part to the bearing. As an alternative to threaded bolts, simple upright pins, also realised to fit into holes of the bearing, might serve to act as guiding means and/or to centre bearing and rotor.

BRIEF DESCRIPTION OF THE DRAWINGS

Other objects and features of the present invention will become apparent from the following detailed descriptions considered in conjunction with the accompanying drawings. It is to be understood, however, that the drawings are designed solely for the purposes of illustration and not as a definition of the limits of the invention.

DETAILED DESCRIPTION OF INVENTION

In the diagrams, like numbers refer to like objects throughout. Objects in the diagrams are not necessarily drawn to scale.

Figure 1:
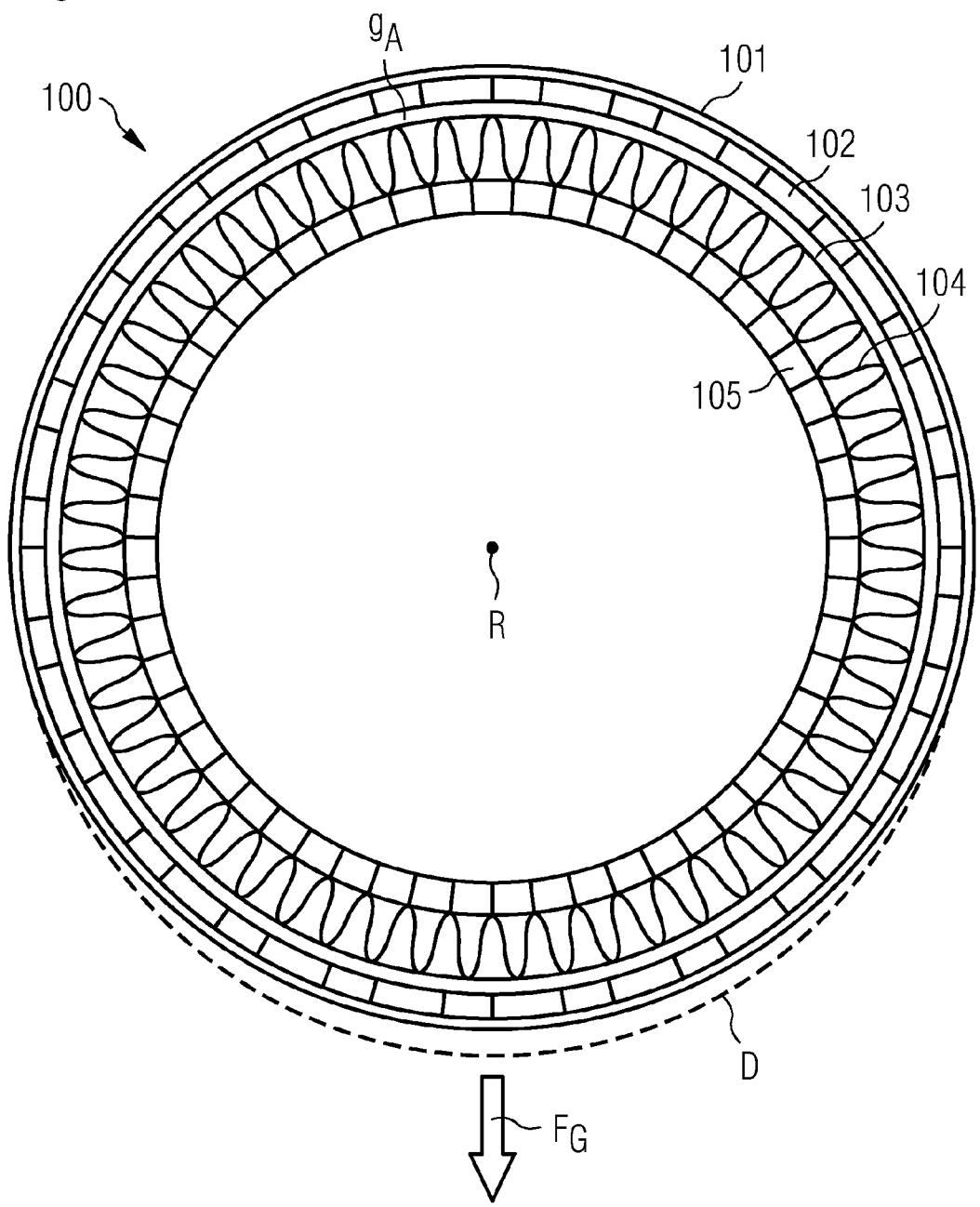
FIG. 1 shows components of a generator during a prior art horizontal assembly process.

FIG. 1 shows components of a direct-drive permanent-magnet generator 100 during a prior art horizontal assembly process. Here, an outer rotor 101 is being supported by some holding means or support structure (not shown in the diagram) such that its rotational axis R is essentially horizontal, i.e. parallel to ground level. Usually, the rotor 101 and main bearing are mounted to an upright support, so that the main body of the rotor 101 protrudes horizontally from the upright support. The rotor 101 is realised to hold many permanent magnets 102 on its interior surface. A stator 103, with windings 104 mounted on a main shaft 105, must be inserted into the rotor 101. During this "horizontal marriage" it is of paramount importance that the windings do not come into contact with the interior surface of the rotor, whether this has been previously loaded with magnets, or not. Damage to either the windings (which are generally formed from rigid steel bars encased in a protective wrapping) or the interior of the rotor (which generally comprises precisely machined grooves for holding the magnets) may result in very costly repairs, and therefore much effort is invested into avoiding such damage. For example, the support structure that holds the rotor must be exactly matched to a support structure that holds the stator as it is inserted into the rotor. Additionally, sensors may be implemented to detect any critical situation. The very narrow air-gap $g_A$ makes the horizontal marriage particularly hazardous. The process is made even more complicated by the weight of the rotor 101, since the force of gravity $F_G$ acts to distort the otherwise circular form of the rotor 101. This distortion D is indicated in the diagram, in an exaggerated manner, by the broken line. Such a distortion might cause cracks to develop in the rotor, or might result in a permanent deformation which can have adverse effects, particularly when the rotor is rotating during operation of the generator. Because extreme care must be taken to avoid such damage, the known horizontal marriage technique is necessarily slow, labour-intensive and therefore also very costly.

Figure 2:
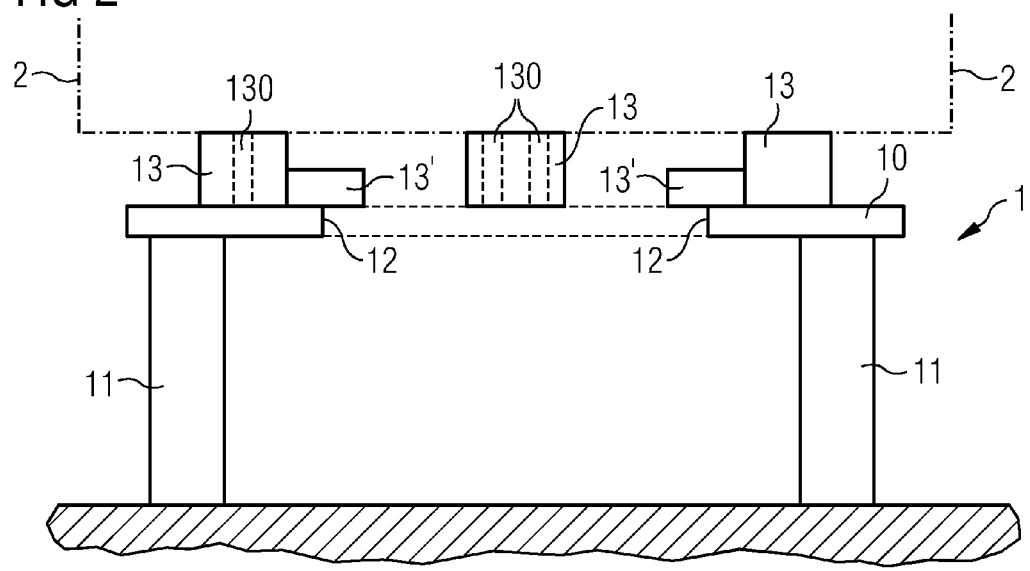
FIG. 2 shows a side view of a first embodiment of an assembly arrangement according to the invention.
Figure 3:
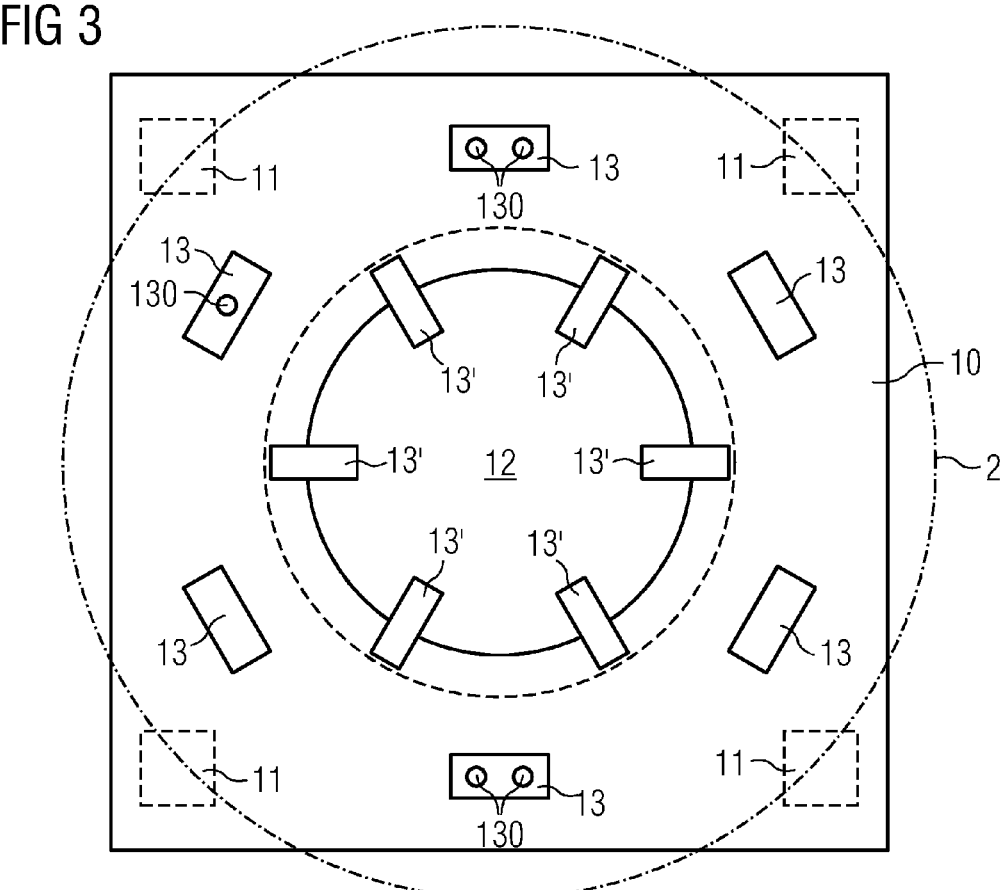
FIG. 3 shows a plan view of the assembly arrangement of FIG. 2.

FIG. 2 shows a side view of a first embodiment of an assembly arrangement 1 according to the invention. FIG. 3 shows a plan view of the same embodiment. Here, the assembly arrangement 1 comprises an assembly table 1 with an essentially horizontal flat upper surface 10 and a number of supporting pillars 11 or columns 11. An opening 12 is made in the upper surface 10, large enough to allow a worker access into an interior cavity of a rotor part 2, indicated here by the broken line, and a stator part (not shown). Several spacer blocks 13, 13' are arranged about the opening 12. Main spacer blocks 13 can support the weight of a rotor part and a stator part, so that the weight of these generator components is evenly distributed. One or more main spacer blocks 13 can have through openings 130 formed to accommodate fasteners for bolting the rotor part 2 to the assembly table 1. The main spacer blocks 13 can also serve to ensure that a bearing remains free and movable during the merging procedure. Auxiliary spacer blocks 13' are used to initially accommodate an anti-ovalization ring without contact to rotor or bearing. These auxiliary spacer blocks 13' can extend into the space above the opening 12, for example if such an anti-ovalization ring has a smaller diameter than the diameter of the opening 12. For clarity, the legs 11 or columns 11 are shown at the corners of the "table", but these could equally well be arranged under spacer blocks 13 for a favourable load distribution.

Figure 4:
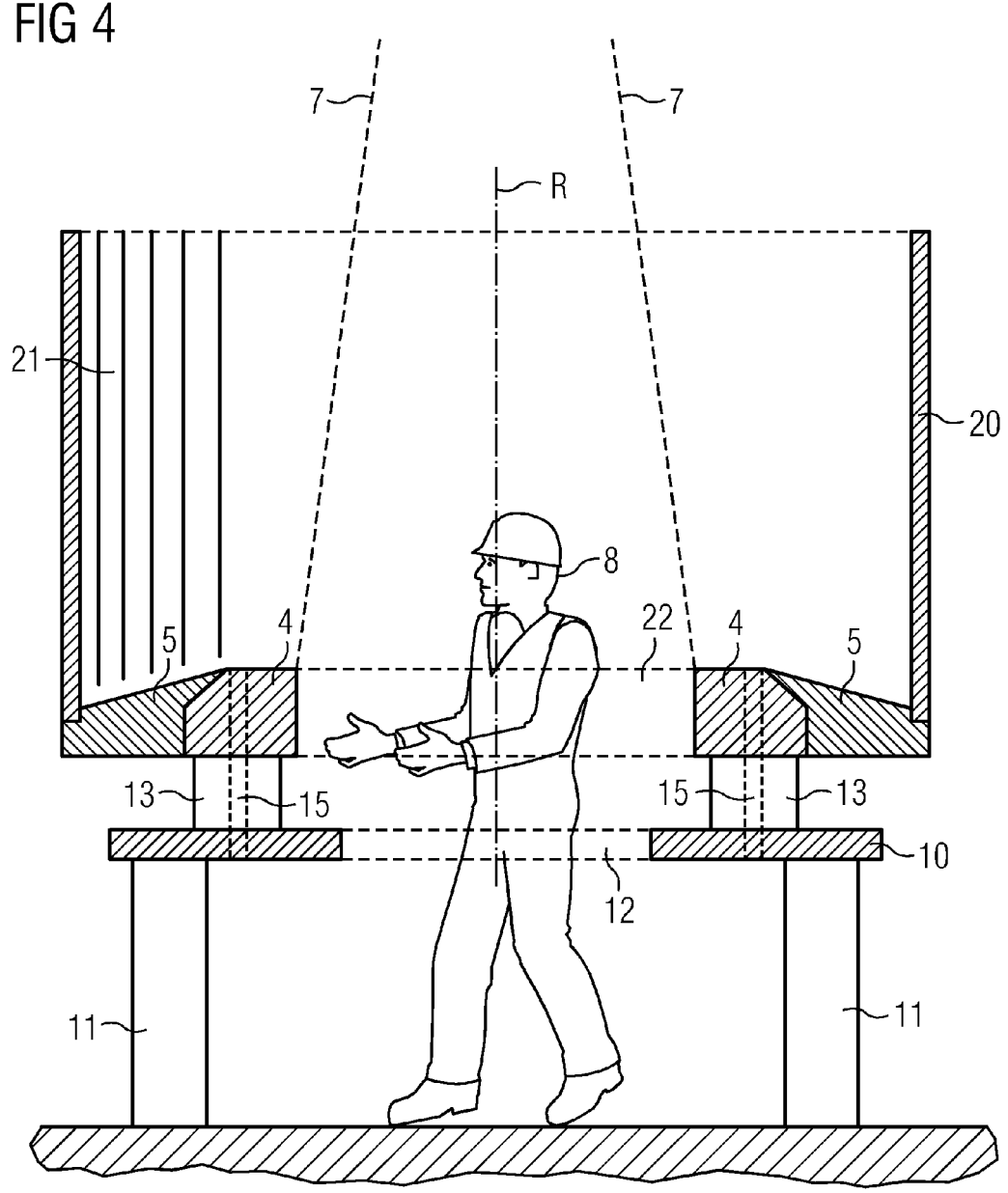
FIG. 4 shows a rotor part supported by the assembly arrangement of FIGS. 2 and 3 in a first stage of a vertical assembly method according to the invention.

FIG. 4 shows the assembly table of FIGS. 2 and 3 being used to support a rotor part 2 in a first stage of a vertical marriage procedure. Here, the rotor part 2 is being lowered onto the spacer blocks 13 of the assembly table 1. Prior to this step, the horizontal level of the upper surface 10 may have been checked. The rotor part 2 comprises a rotor housing 20 mounted to a conical front plate 5 and a main bearing 4 at its "lower" side. This "lower" side will later be the hub side of the rotor when it assumes a horizontal position during operation in a wind turbine. The components of the rotor part 2 are shown in a very simplified manner for the sake of clarity. The rotor housing 20 has already been machined to form grooves 21 for holding permanent magnets. For clarity, only a few such grooves 21 are indicated here. The entire rotor part assembly 2 is lowered onto the spacers 13 by means of suitable lifting apparatus, such as a crane and chains 7, indicted here by the dotted lines. When in place on the assembly table 1, the rotor part 2 is positioned such that its rotational axis R is vertical. In this position, the rotor part 2 is effectively protected from any own-weight distortion. Prior to this step, an anti-ovalization ring (not shown) may have been put in place on auxiliary spacer blocks on the assembly table 2 so that the rotor part 2 is lowered directly onto the anti-ovalization ring. The anti-ovalization ring will be mounted to the bearing 4 later, for example after the stator has been mounted to the bearing and after a bearing run-in procedure has been performed. Therefore, the anti-ovalization ring can initially be laid on other auxiliary spacer blocks at a lower level that the main spacer blocks 13, so that the anti-ovalization ring can be placed in readiness for connection to the bearing at a later stage. The part of the bearing 4 that will be connected to the antovalization ring may extend to a lower level than the upper surface of the main spacer blocks 13 so that it rests on the anti-ovalization ring, but this is not shown here for clarity, since the diagram is purposely kept simple.

A worker 8 can comfortably access any interior regions of the rotor part 2 through the opening 12 in the table and corresponding openings 22, such as circular openings in the rotor part 2, an ovalization ring, main bearing 4, front plate 5, etc. As an additional safety precaution, the rotor part 2 can be secured to the assembly table 1 by means of threaded rods 15 passed through the spacer blocks 13 and screwed into bushings of the rotor part 2. As mentioned above, the threaded rods 15 also act as visual and physical guides when lowering the rotor part 2 and/or bearing 4 onto the assembly table 1 and centring these components 2, 4. Furthermore, the threaded rods 15 ensure that the rotor part 2 and/or bearing 4 are in a predefined position or orientation, thus facilitating the later attachment of a stator part to the bearing. As an alternative to threaded bolts, simple pins, also realised to fit into holes of the bearing 4 might serve to act as guiding means.

Figure 5:
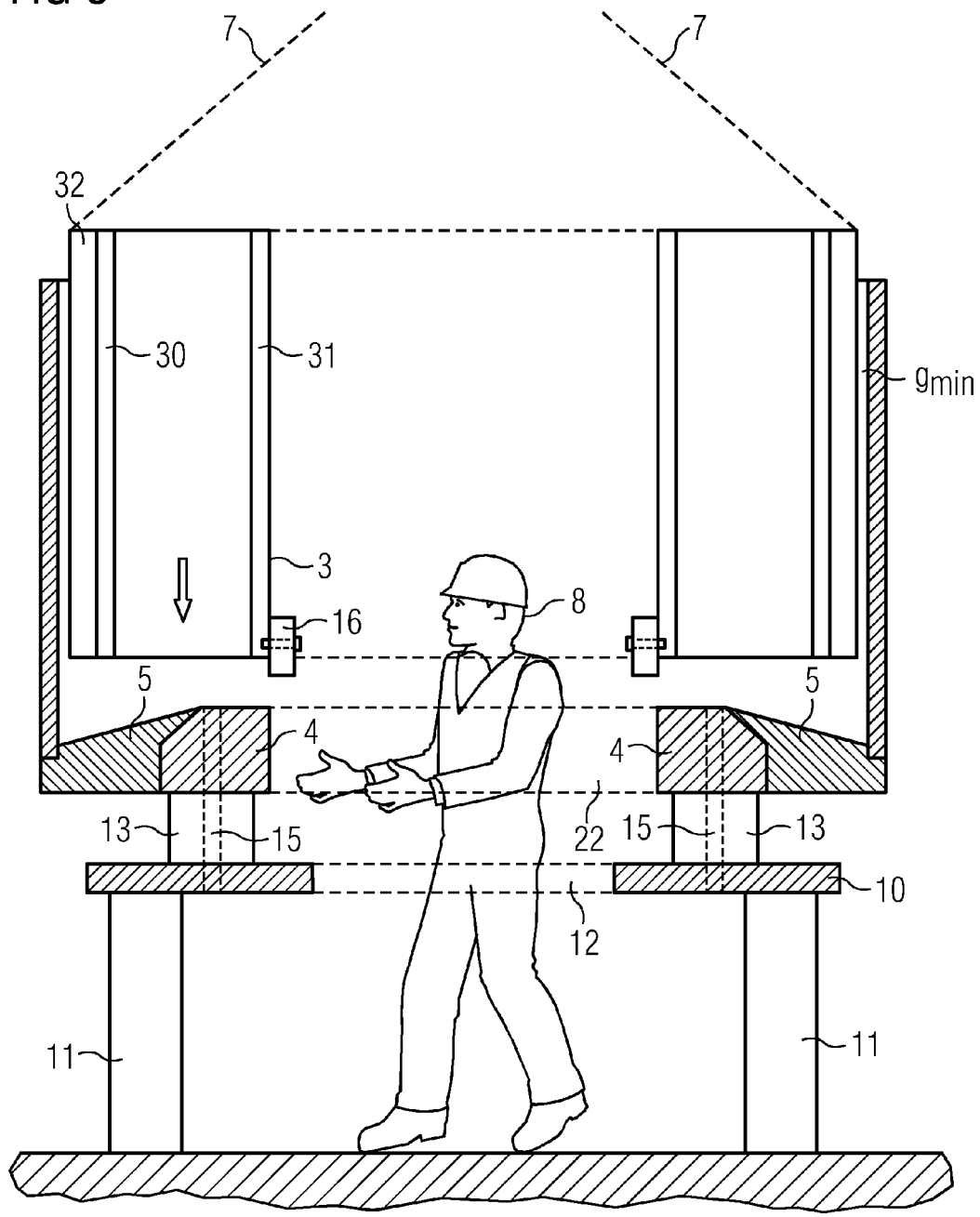
FIG. 5 shows a further step in the vertical assembly method according to the invention.

FIG. 5 shows a further step in the vertical marriage assembly. Here, a stator part 3 is being lowered into the rotor part 2. A guidance block 16 has been previously affixed to a specific position on the stator part 3, and this guidance block 16 is used to guide the stator part 3 into its exact position relative to the rotor part 2. The guidance block 16 can comprise a mark that should align to a corresponding mark on the rotor part 2. Furthermore, the guidance block 16 is machined to an exact size and extends some distance below a lower surface of the stator part 3 to indicate a specific clearance that should be maintained. The stator part 3 comprises windings 32 mounted onto a main shaft 30, and an inner 31 that will later act as a passageway between hub and nacelle. The gap between main shaft 30 and inner shaft 31 can accommodate a cooling arrangement. Because gravity cannot act to distort the circular shape of the rotor housing 20, and because the stator part 3 is simply lowered into place by a crane, it is comparatively easy to ensure that neither the windings nor the inner surface of the rotor housing 20 are damaged as the stator part 3 is lowered into place. A certain minimum gap $g_{min}$ can always be maintained all around during the "vertical marriage". By initially ensuring that the relative positions of the rotor part 2 and stator part 3 are correct, for example by aligning specific markings on the rotor part 2 and guidance block 16 of the stator part 3, the stator part 3 can be exactly aligned at its allotted position relative to the main bearing 4, to which it can then be secured by workers standing in the openings 12, 22. Once the stator part 3 has been lowered into place on the bearing 4, these can be provisionally connected together, and a bearing run-in procedure can be carried out. Subsequently, the connection of the stator part 3 to the bearing 4 is finalized.

Figure 6:
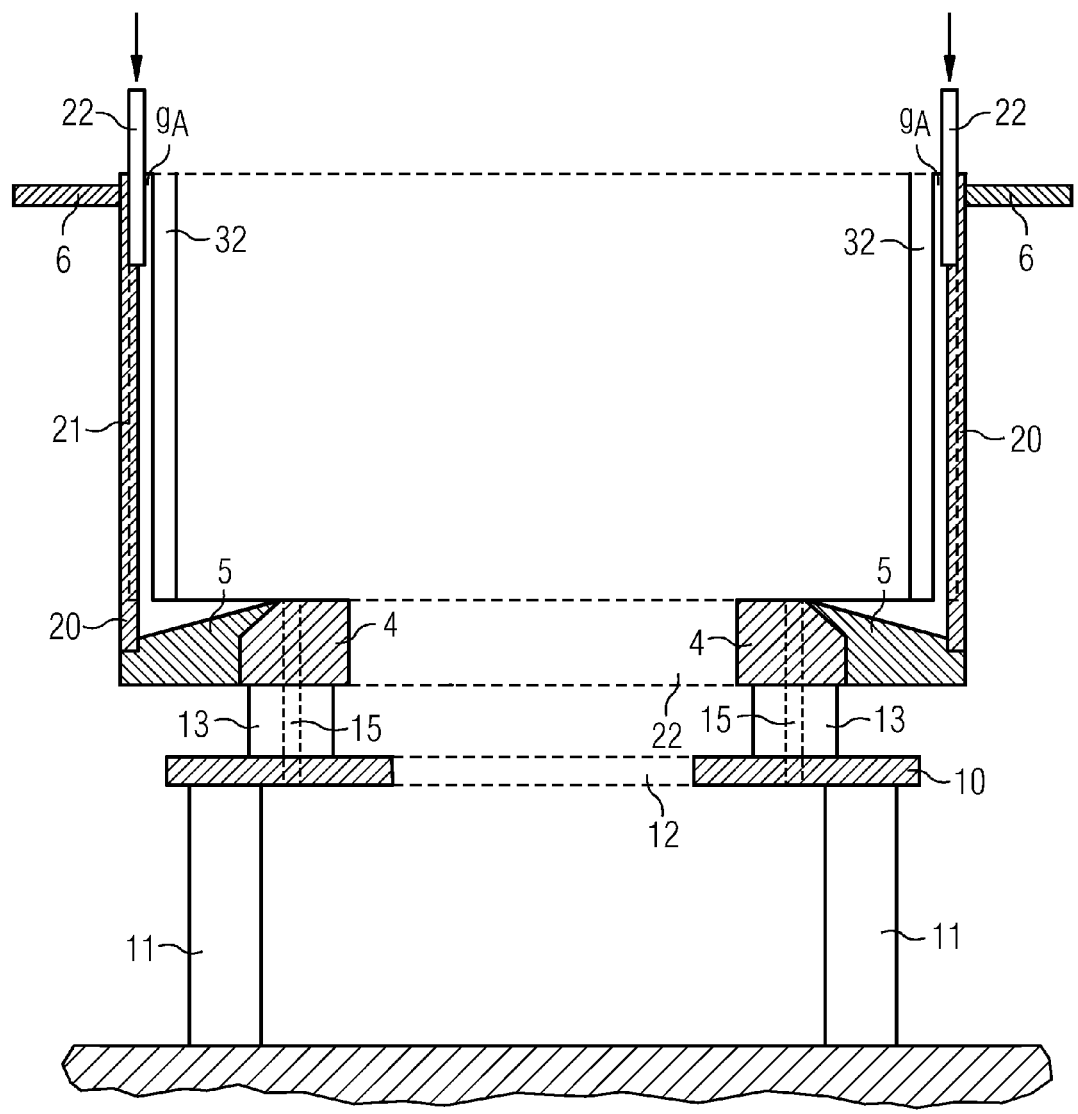
FIG. 6 shows a further step in the vertical assembly method according to the invention.

FIG. 6 shows a further step in the vertical marriage assembly. Here, magnets are being loaded into grooves 21 of the rotor housing 20. For stability during the loading process, a stabilizing ring 6 has been mounted to the "upper" side, i.e. a brake-side of the rotor housing 20. The magnets can conveniently be lowered into place from above. To this end, a platform (not shown in the diagram) can be constructed about the generator in assembly so that workers can conveniently stand at the upper level of the rotor part 2. Since gravity is not an issue, the magnets can be lowered into the grooves 21 while maintaining the necessary air-gap $g_A$, usually only in the order of few millimeters.

After the magnet loading step, further assembly steps can be carried out while the assembled generator is resting on the support surface. For example, the brake disc can be mounted to the upper side of the rotor housing, and various testing steps can be performed. Finally, any threaded rods used to secure the rotor part 2 to the assembly table 1 can be removed, and the assembled generator can then be lifted off the assembly table.

Figure 7:
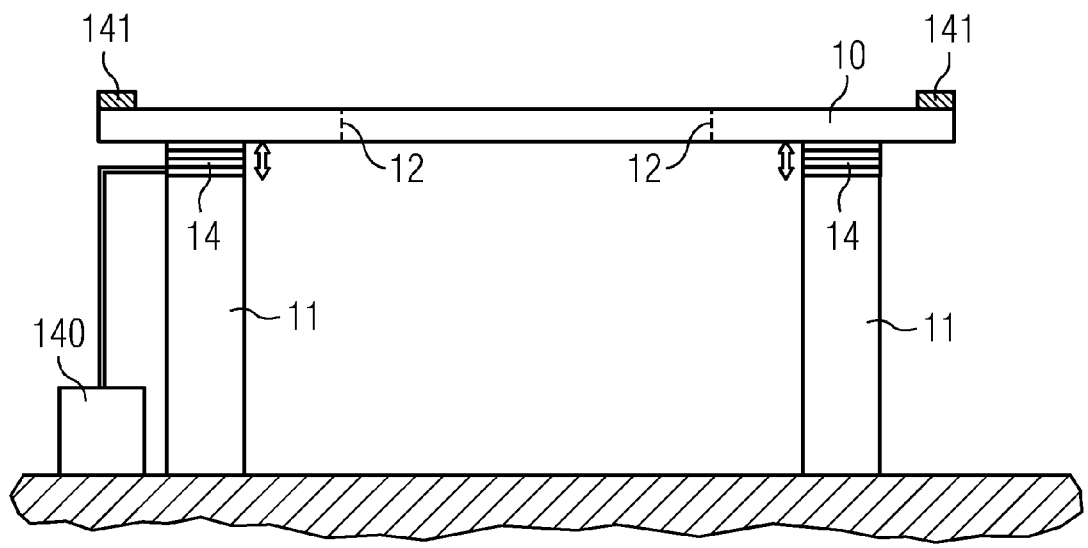
FIG. 7 shows a second embodiment of an assembly arrangement according to the invention.

FIG. 7 shows a further elaboration of the assembly table 1 of the preceding FIGS. 2-6. Here, the level of the upper surface of the table 1 can be adjusted as required. This is made possible by level adjusting means 14 arranged between the supporting columns 11 and the table top 10. For example, a hydraulic level adjusting means 14 can comprise a hydraulic cylinder as actuator to allow a vertical motion, as indicted by the arrows, so that the overall height of a column 11 can be slightly extended or retracted, as required. A hydraulic pump 140 can be used to control one or more of the level adjusting means 14. The level adjusting means 14 can be controlled manually, for example using a visual level indicator such as a spirit level to determine any departure from the horizontal. Alternatively, the level adjusting means 14 can be controlled automatically. For example, level sensing means 141, arranged on or below the support 10, can be used to detect any departure from the horizontal and can send an appropriate signal to a controller of the level adjusting means 14.

Figure 8:
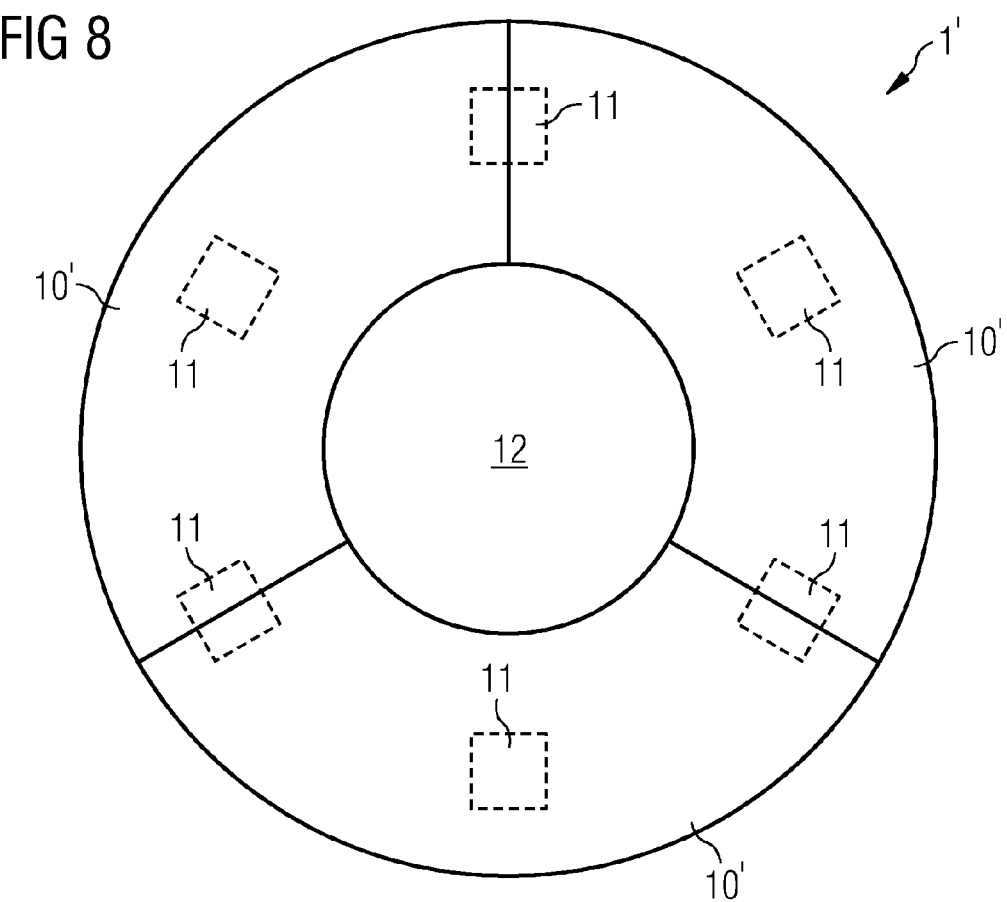
FIG. 8 shows a third embodiment of an assembly arrangement according to the invention.

FIG. 8 shows a plan view of an alternative embodiment of an assembly arrangement 1' according to the invention. Here, the assembly arrangement 1' comprises a three-part construction, with three matched supporting segments 10'. The segments 10' are formed such that an opening 12 remains when the segments 10' are arranged in contact with each other. The segments 10' can be laid onto a number of supporting columns 11 or pillars 11. Any spacer blocks can be placed above these columns 11, so that a favourable load transfer can be achieved when the rotor rests on the spacer blocks. The round shapes of the assembly arrangement 1' and the opening 12 shown here are only exemplary, and other shapes are possible. Also, any shape and any number of supporting segments 10' can be used to obtain a desired assembly support.

Although the present invention has been disclosed in the form of preferred embodiments and variations thereon, it will be understood that numerous additional modifications and variations could be made thereto without departing from the scope of the invention. For example, the assembly structure and/or the assembly method can be adapted as appropriate for the assembly of a generator with an interior rotor, and/or for a generator in which the field is stationary while the armature rotates. Basically, the method of vertical assembly is suited for any assembly in which the distorting effects of gravity need to be avoided.

For the sake of clarity, it is to be understood that the use of "a" or "an" throughout this application does not exclude a plurality, and "comprising" does not exclude other steps or elements.

The invention claimed is:

1. A method of vertically assembling a generator of a wind turbine using an assembly arrangement including a horizontal assembly support, the method comprising:
   arranging a rotor part onto the horizontal assembly support which supports components of the generator such that a rotational axis of a component of the generator when operating to generate electricity is essentially vertical during assembly of a stator part to the rotor part, and the horizontal assembly support is configured to allow a human body to extend into an interior of a component of the generator during assembly of the stator part to the rotor part;

assembling the stator part to the rotor part including:
arranging the stator part in the rotor part; and
joining the stator part to the rotor part to form at least a portion of the generator for the wind turbine; and mounting a stabilizing ring to the rotor part prior to loading a plurality of magnets into the rotor part, wherein the plurality of magnets are mounted to the rotor part after the arranging the stator part in the rotor part.

2. The method according to claim 1, further comprising: mounting the rotor part to a bearing.

3. The method according to claim 1, further comprising: mounting an anti-ovalization ring to the bearing.

4. The method according to claim 1, wherein the arranging the stator part in the rotor part comprises lowering the stator part into the rotor part.

5. The method according to claim 4, further comprising:
fastening the rotor part to the horizontal assembly support prior to the arranging the stator part in the rotor part.

6. The method according to claim 1, wherein the assembly arrangement comprises an assembly table and a plurality of essentially vertical supporting columns, and wherein the horizontal assembly support comprises an essentially horizontal upper surface of the assembly table.

7. The method according to claim 6, wherein the assembly table comprises an access opening shaped according to an opening of the rotor part.

8. The method according to claim 1, wherein the assembly arrangement comprises a plurality of spacer blocks mounted to the assembly support in order to provide access to the underside of the rotor part.

* * * * *